United States Patent
Hensel et al.

[11] Patent Number: 5,777,979
[45] Date of Patent: Jul. 7, 1998

[54] APPARATUS FOR LASER EXPOSURE OF A SUBSTRATE DISK AND A METHOD FOR THE CENTERED MOUNTING OF A SUBSTRATE DISK

[75] Inventors: Bernd Hensel, Eschborn; Friedrich Hofmann, Büdingen; Hermann Koop, Ronnenberg; Eberhard Feick, Müchen; Franz Richter, Eichenau, all of Germany

[73] Assignee: Balzers Und Leybold Deutschland Holding AG, Hanau, Germany

[21] Appl. No.: 753,796

[22] Filed: Nov. 27, 1996

[30] Foreign Application Priority Data

Nov. 28, 1995 [DE] Germany ............ 195 44 281.4

[51] Int. Cl.⁶ ............ G11B 23/00; G11B 25/04
[52] U.S. Cl. ............ 369/270; 369/264; 369/271; 369/282; 360/99.12
[58] Field of Search ............ 369/264, 269, 369/270, 271, 282; 360/98.08, 99.12

[56] References Cited

U.S. PATENT DOCUMENTS

| | | | |
|---|---|---|---|
| 4,470,054 | 9/1984 | Wrobel | 369/271 X |
| 4,933,927 | 6/1990 | Ross | 369/270 |
| 5,043,973 | 8/1991 | Ocheltree et al. | 369/270 |
| 5,054,016 | 10/1991 | D'Alayer et al. | 369/270 |
| 5,069,156 | 12/1991 | Suzuki | 118/52 |
| 5,583,845 | 12/1996 | Aki | 369/270 |
| 5,601,645 | 2/1997 | Nonomura et al. | 118/52 |

FOREIGN PATENT DOCUMENTS

| | | |
|---|---|---|
| 58-048277 | 3/1983 | Japan. |
| 58-153279 | 9/1983 | Japan. |
| 62-172558 | 7/1987 | Japan. |
| 62-172559 | 7/1987 | Japan. |
| 1-064161 | 3/1989 | Japan. |
| 1-149255 | 6/1989 | Japan. |
| 1-217760 | 8/1989 | Japan. |
| 6-004912 | 1/1994 | Japan. |
| 6-170855 | 6/1994 | Japan. |

Primary Examiner—Stuart S. Levy
Assistant Examiner—William J. Klimowicz
Attorney, Agent, or Firm—Felfe & Lynch

[57] ABSTRACT

A vertically disposed drive spindle (5) rotates turntable (6) supporting a substrate (7) at high speed, the turntable having a smaller diameter than the substrate. Coaxial with the turntable (6), a centering ring (10) having a frustoconical inside surface can be raised vertically between a lower and upper position. The latter has on its upper side a greater diameter and on its lower side a smaller diameter than the substrate (7). In its lower position the centering ring (10) is at a distance from a substrate (7) lying on the turntable (6), but in its upper position its inside surface supports the substrate (7) at an axial distance above turntable (6).

7 Claims, 1 Drawing Sheet

APPARATUS FOR LASER EXPOSURE OF A SUBSTRATE DISK AND A METHOD FOR THE CENTERED MOUNTING OF A SUBSTRATE DISK

BACKGROUND OF THE INVENTION

The invention relates to an apparatus for the laser exposure of a substrate disk, which has a vertically disposed spindle rotating at high speed which bears a turntable for mounting the substrate and has a smaller diameter than the substrates plus means for centering the substrate on the turntable. The invention furthermore relates to a method for the centered mounting of a substrate disk.

During laser beam exposure, the substrate disks, usually called masters, rotate at up to 7,200 revolutions per minute. Therefore it is necessary that the substrate be mounted well centered on the turntable to prevent imbalance. Imbalance would result in vibrations and tracking errors. It is known to provide the substrates with a centering stud at their center, which enters a corresponding central bore in the turntable. Such centering studs, however, interfere with the working procedures that follow, so that attempts are made to perform the laser exposure without centering studs. Furthermore, the handling system that deposits the substrate on the turntable has to operate very accurately so that the centering stud really is placed in the centering bore without tilting.

It is also known to accomplish the centering by means of centering pins on the turntable between which the substrate is held. The centering is then performed by means of the outer circumferential surface of the substrate. Such external centering requires relatively wide clearance and results in great eccentricity if the edge of the substrate has slight irregularities. Such irregularities in the form of break-outs, however, occur relatively frequently in the case of re-used substrates.

SUMMARY OF THE INVENTION

The invention is addressed to an apparatus which will permit a highly accurate centered mounting of substrate disks without the need for a central centering stud on the substrate or centering pins in contact with the outer periphery of the substrate. Furthermore, a method for the centered mounting of substrate disks is to be developed.

The first mentioned object is achieved by providing a ring having a frustoidal inside surface coaxially with the turntable, which ring can be shifted vertically between a bottom and a top position and has on its upper side a larger inside diameter and on the lower side a smaller inside diameter than has the substrate. The conical ring in its bottom position is at a distance from a substrate lying on the turntable, but in its upper position it holds the substrate on its inside surface at an axial distance above the turntable.

In such an apparatus the substrate that is to be mounted can be deposited on the turntable initially with a relatively great eccentricity, so that the automatic manipulating system provided need not operate with especially great accuracy. After the substrate is deposited, a very simple centering is performed by raising the substrate by means of the ring and again laying it down on the turntable. Only then is it gripped. Since according to the invention the centering is performed by raising the substrate by its entire circumferential surface, small breaks in the circumferential surface do not affect centering accuracy. It is not necessary that the substrates be accurately centered even before they are laid on the turntable.

The ring having a frustoconical inside surface, in addition to its centering function, can also serve as a safety net to catch the substrate in case it should come loose from the turntable and fly off it due to the high rotatory speed. To this end, provision is made by the invention for the upper edge of the ring to project above the top surface of the substrate lying on the turntable when in its lowered position. This saves the cost, always very great, of repairing the apparatus should a substrate come loose from the turntable and wreck the laser system.

The substrate can be centered when lifted in the ring merely by its weight. However, it is also possible to provide the ring with a shaking means.

Alternatively, the centering action can be improved by providing the spindle with a shaking means.

The second object, namely developing a method for the centered mounting of a substrate disk on a turntable of a laser exposure apparatus, is achieved by slightly raising up the substrate, after the substrate is laid on the turntable by means of a frustoconical inside surface of a ring disposed coaxially with the turntable. The frustoconical surface of the ring contacts the circumferential surface of the substrate, and the substrate is then laid back again on the turntable by lowering the conical ring, and only then is it clamped.

Such a procedure does not require any centering stud on the substrate and results in a high centering accuracy even if there are chips or other irregularities on the circumference. Furthermore, if the method of the invention is used, there is no need for a manipulating system operating with very high accuracy in order to lay the substrate on the turntable.

If it should happen that the substrates cannot by their weight center themselves when raised by the conical ring, this can be remedied if the ring is shaken while the substrate is raised, or if the turntable is shaken while the ring is being lowered.

The invention is susceptible of various embodiments. For further explanation, an apparatus of the invention is represented greatly simplified in the drawing and is described herewith.

DETAILED DESCRIPTION OF THE PREFERRED EMBODIMENTS

Figure 1:
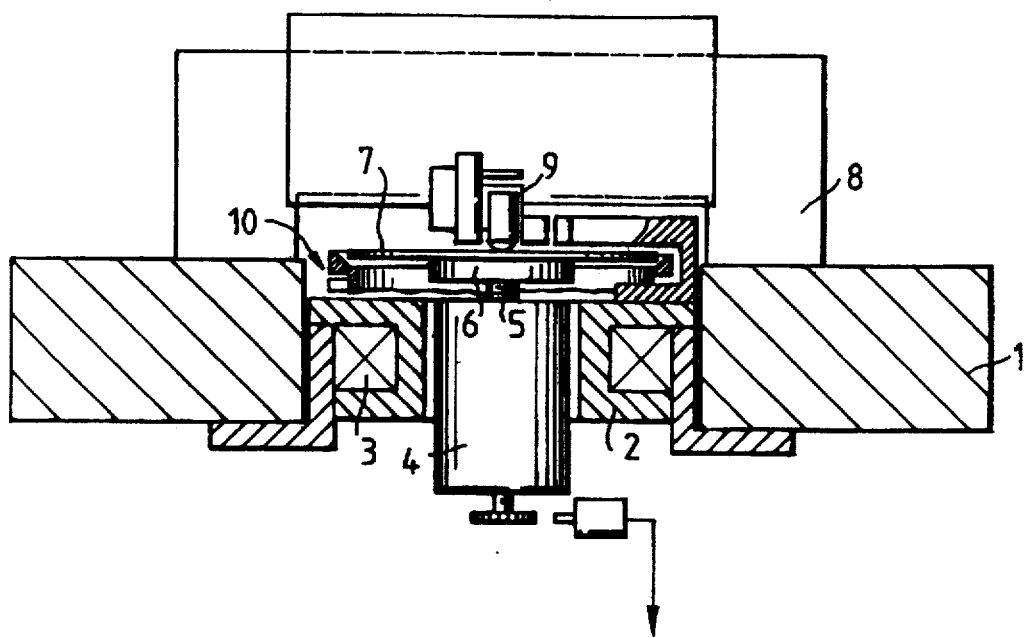
FIG. 1 is a side section view of a portion of an apparatus of the invention.

FIG. 1 shows a work table 1 in which a slide 2 runs on air bearings 3 transversely of the plane of drawing. The slide 2 bears a motor 4 which drives a turntable 6 by a vertically aligned spindle 5. On this turntable lies a substrate disk 7 which is held there in a conventional manner, for example by a vacuum.

Over the work table 1 is a bridge 8 on which a laser lens 9 is mounted.

Important to the invention is a ring 10 having a frustoconical inside surface, which ring can be raised coaxially with the turntable 6. Before being exposed to the laser the substrate is first deposited on the turntable 6 by a conventional manipulating system not shown. At the same time the conical ring 10 assumes its lowered position shown in FIG. 1. Then the ring 10 is raised to its upper position shown in FIG. 2, so that its frustoidal inside surface comes against the circumferential surface of the substrate 7 and thereby raises it from the turntable 6 while simultaneously centering it. This centering action can be improved by a shaking device 11 engaging the conical ring.

Figure 2:
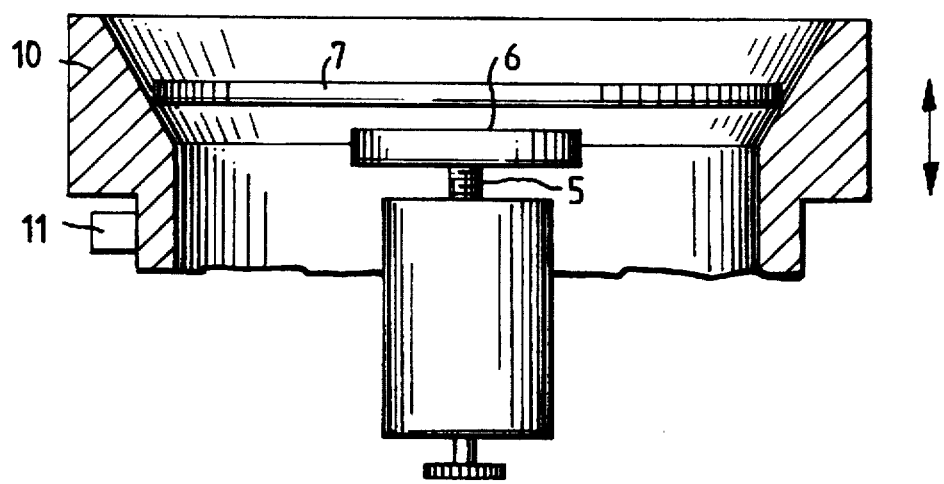
FIG. 2 is a section view showing a turntable of the apparatus with the substrate raised by the centering means.

FIGS. 1 and 2 furthermore show that the ring 10 is of such dimensions that even in its lowered position its upper edge is above the substrate 7. Thus the conical ring acts as a safety net to catch the substrate 7 if it should come free of the turntable 6.

We claim:

1. Apparatus for the laser beam exposure of a substrate disk, said apparatus comprising a turntable having a top surface for supporting a substrate disk, said top surface having a smaller diameter than said substrate disk, means for rotating the turntable at high speed, and a centering ring which is coaxial to said turntable and movable axially from a lower position to an upper position, said centering ring having a frustoconical inside surface which in the lower position is spaced from said substrate disk, and in the upper position supports the substrate disk circumferentially at an axial distance above said turntable said, centering ring including at least a portion of the frustoconical inside surface having an inner diameter larger than the outer edge diameter of the substrate disk to thereby center the substrate disk at the upper position by contacting the outer edge diameter of the substrate disk.

2. Apparatus as in claim 1 wherein said ring has an upper margin which in said lower position is above a substrate disk supported on said turntable.

3. Apparatus as in claim 1 further comprising means for shaking said ring in order to center a substrate when said ring is in said upper position.

4. Apparatus as in claim 1 wherein said means for rotating said substrate disk comprises a vertically disposed spindle, said apparatus further comprising means for shaking said spindle.

5. Method for centered mounting of a substrate disk on a turntable, said method comprising providing a centering ring which is coaxial to said turntable and movable axially from a lower position to an upper position, said centering ring having a frustoconical inside surface which can support a substrate disk about its circumference, supporting said substrate disk on said frustoconical inside surface, laying said substrate disk on said turntable by moving said ring to said lower position, raising said substrate disk by raising said ring to said upper position, whereby said frustoconical inside surface supports said substrate about its circumference above said turntable, said centering ring including at least a portion of the frustoconical inside surface having an inner diameter larger than the outer edge diameter of the substrate disk to thereby center the substrate disk at the upper position by contacting the outer edge diameter of the substrate disk, and lowering said ring so that said substrate is supported by said turntable.

6. Method as in claim 5 further comprising shaking said centering ring in said upper position.

7. Method as in claim 5 further comprising shaking said turntable while said centering ring is being lowered.

* * * * *